United States Patent [19]
Fritz et al.

[11] Patent Number: 5,513,023
[45] Date of Patent: Apr. 30, 1996

[54] POLARIZING BEAMSPLITTER FOR REFLECTIVE LIGHT VALVE DISPLAYS HAVING OPPOSING READOUT BEAMS ONTO TWO OPPOSING SURFACES OF THE POLARIZER

[75] Inventors: Victor J. Fritz, Chino Hills; Ronald S. Gold, Fullerton, both of Calif.

[73] Assignee: Hughes Aircraft Company, Los Angeles, Calif.

[21] Appl. No.: 316,763

[22] Filed: Oct. 3, 1994

[51] Int. Cl.⁶ .................. G02F 1/1335; G02F 1/1343
[52] U.S. Cl. ................. 359/40; 359/41; 359/49; 359/63; 359/58
[58] Field of Search .................. 359/48, 41, 63, 359/49, 831, 832, 833, 58, 40; 353/33, 81

[56] References Cited

U.S. PATENT DOCUMENTS

| | | | |
|---|---|---|---|
| 5,083,854 | 1/1992 | Zampolin et al. | 359/40 |
| 5,153,752 | 10/1992 | Kurematsu et al. | 359/40 |
| 5,239,322 | 8/1993 | Takanashi | 359/63 |
| 5,295,018 | 3/1992 | Konuma et al. | 359/487 |
| 5,382,790 | 1/1995 | Robillard et al. | 359/48 |

OTHER PUBLICATIONS

*Transferred–Silicon AMLCDs*, Information Displays Oct. 1993, pp. 21–23, Ken Werner.

Primary Examiner—William L. Sikes
Assistant Examiner—Fetsum Abraham
Attorney, Agent, or Firm—Wanda K. Denson-Low; Georgann S. Grunebach

[57] ABSTRACT

A polarizing beamsplitter (PBS) that can be used with reflective light valve displays includes two polarizing surfaces. A light source projects opposing readout beams onto the polarizing surfaces, which reflect linearly polarized (S or P) components of the readout beams. The polarized readout beams illuminate respective portions of a reflective light valve cell that bears an image intensity pattern. The cell spatially modulates the readout beams' polarization in accordance with the image intensity pattern and reflects the polarization modulated beam back towards the polarizing beamsplitter. The PBS spatially analyzes the readout beams' intensities in accordance with their polarization modulations.

14 Claims, 2 Drawing Sheets

POLARIZING BEAMSPLITTER FOR REFLECTIVE LIGHT VALVE DISPLAYS HAVING OPPOSING READOUT BEAMS ONTO TWO OPPOSING SURFACES OF THE POLARIZER

BACKGROUND OF THE INVENTION

1. Field of the Invention

The present invention generally relates to polarizing beamsplitters and associated image display systems, and more specifically to a polarizing beamsplitter that can be used with reflective liquid crystal display systems.

2. Description of the Related Art

U.S. Pat. No. 5,239,322 to Takanashi et al. discloses a conventional image display system in which a readout beam is projected through a collimating lens and onto a polarizing beamsplitter (PBS). The PBS reflects the S-polarized component of the readout beam, which illuminates the face of a spatial light modulator (SLM). The SLM spatially modulates the polarization of the reflected portion of the readout beam in accordance with the spatial intensity pattern of an image. The PBS doubles as a polarization analyzer and spatially modulates the readout beam's intensity in accordance with its polarization modulation. The intensity modulated beam passes through a projection lens, typically implemented as a multi-lens device, which focuses and reimages the intensity modulated beam onto a screen.

The PBS has a single polarizing surface, typically positioned at 45° with respect to the SLM. The thickness of the PBS determines the minimum back focal length (the distance between the SLM and the projection lens) for the system. As the PBS's width, and hence thickness increases to accommodate higher resolution or larger images, the back focal length increases proportionally, thus increasing the display system's overall length. Increasing the focal length causes the light to diverge from the SLM over a larger area, thus requiring larger and heavier lens elements to capture enough light to display the image.

In this configuration, the illumination of the SLM is non-uniform. The collimating lens is not ideal, and thus the portions of the readout beam which pass through its edges are refracted more than the portions which pass through the center of the lens. Therefore the readout beam's intensity is a maximum at its center and gradually decreases towards its edges. The illumination of the SLM affects the illumination and contrast of the displayed image.

Takanashi discloses a configuration for reducing the back focal length by positioning the projection lens between the SLM and the PBS. The readout beam is passed through a second lens that focuses it onto the PBS. The S-polarized readout beam is reflected towards the projection lens, which collimates the beam and projects it onto the cell. This approach reduces the back focal length but concentrates the beam's optical power onto a small area on the polarizing surface, which can easily damage the PBS. As the luminance, and hence power requirements for image display systems increase, the problem becomes more significant.

SUMMARY OF THE INVENTION

The present invention provides a PBS for use in a reflective light valve display system that results in a compact and light weight system with improved illumination uniformity that is capable of operating at high power levels.

This is accomplished by using a PBS that has two polarizing surfaces. A light source projects opposing readout beams onto the polarizing surfaces, which reflect the linearly polarized (S or P) components of the readout beams. The polarized readout beams illuminate respective portions of a reflective liquid or solid crystal cell that bears an image intensity pattern. The cell spatially modulates the readout beams' polarizations in accordance with the image intensity pattern and reflects the polarization modulated beams back towards the PBS. The PBS spatially analyzes the readout beams' intensities in accordance with their polarization modulations.

For a better understanding of the invention, and to show how the same may be carried into effect, reference will now be made, by way of example, to the accompanying drawings.

DETAILED DESCRIPTION OF THE INVENTION

The present invention utilizes a PBS that provides two polarizing surfaces, instead of the single surface common to prior PBSs, to increase the uniformity of an image display system. The PBS is half as thick as conventional PBSs, reducing both the back focal length and the total length of the display system by approximately a factor of two. The readout beam is preferably split into four beams, with each beam projected onto half of one of the polarizing surfaces. The polarizing surfaces reflect a linear component (S or P) of the readout beam onto respective quadrants of a reflective light valve such as a liquid crystal light valve (LCLV) or a solid crystal light valve, e.g., $KD_2PO_4$, thereby improving the illumination uniformity.

Figure 1:
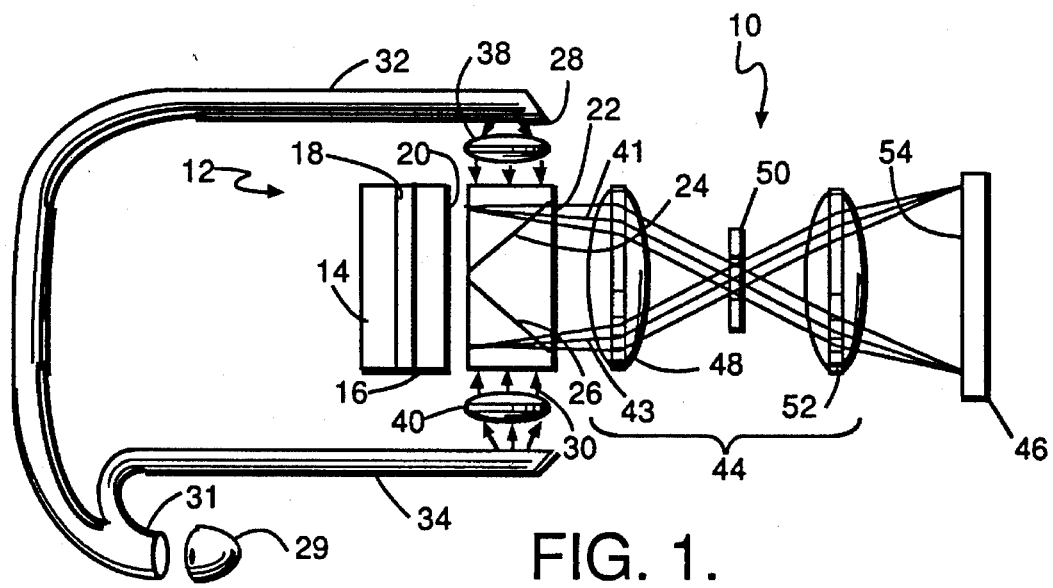
FIG. 1 is a simplified side elevation view of an image display system that embodies the polarizing beamsplitter of the present invention.
Figure 2:
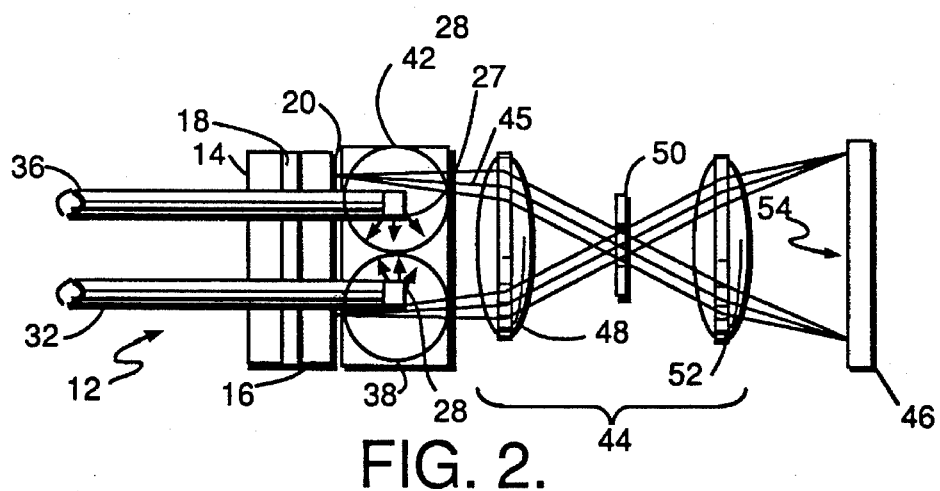
FIG. 2 is a simplified top plan view of the image display system of FIG. 1.

FIGS. 1 and 2 are respectively side elevation and top plan views respectively of an image display system 10 that incorporates the invention. A reflective liquid crystal light valve (LCLV) 12 for example includes an addressing circuit 14, a liquid crystal cell 16 and a mirror 18 between them. The addressing circuit writes a pixelated image intensity pattern 20 onto the liquid crystal cell 16 by applying voltages across the individual liquid crystals in the cell. The crystals are rotated in proportion to the voltages which, in turn, are proportional to the corresponding pixel intensities. The addressing circuit 16 can be an active matrix circuit such as described by Werner, "Transferred-Silicon AML-CDs" *Information Display*, Oct. 1993, pp. 21–23, a CCD array as disclosed in U.S. Pat. No. 4,227,201 to Grinberg et al. or a photo-activated layer such as described in U.S. Pat. No. 4,019,807 to Boswell et al. In the active matrix and CCD circuits, the digital images are stored in an electronic medium such as a video tape recorder (VTR) and read out by the addressing circuit, which writes the corresponding intensity pattern onto the cell. In the photo-activated light valve, the images are projected onto a photosensitive layer with low intensity light. The photosensitive layer applies voltages across the liquid crystals that correspond to the image intensity pattern.

A PBS 22 is positioned adjacent to the exposed surface of the liquid crystal cell 16, and includes two polarizing surfaces 24 and 26, which together form a 'V' shape, with the surfaces extending away from the cell 16 at equal angles, preferably 45°. The PBS's width, shown as the vertical dimension in FIG. 1, is approximately equal to that of the cell 16, and its thickness, shown as the horizontal dimension in FIG. 1, is approximately half its width. The polarizing surface angles can vary by approximately plus or minus 10°, but the projection optics become more complicated for angles other than 45°. The polarizing surfaces typically reflect S-polarized light and transmit P-polarized light. However, it is possible to reflect P-polarized light and transmit S-polarized light.

Two pairs of opposing collimated readout beams, of which beams 28 and 30 are shown in FIG. 1 and beams 27 and 28 are shown in FIG. 2, are projected onto respective polarizing surfaces 24 and 26, respectively, to illuminate respective halves of the liquid crystal cell 16 with S-polarized light (for the case in which the polarizing surfaces reflect an S-polarization). In the preferred embodiment, a several hundred watt ton multi-kilowatt arc lamp 29 illuminates one end of a fiber optic cable 31. The other end of the cable is split into four bundles of fibers, with each of the fiber bundles and an associated collimating lens positioned adjacent to the PBS 22. Two fiber bundles and associated lenses are positioned side-by-side above the PBS, and two below. Fiber bundles 32 and 34 and collimating lenses 38 and 40 on the near side of the PBS are shown in FIG. 1, fiber bundles 32 and 36 and lenses 38 and 42 are shown in FIG. 2, while the fourth fiber bundle and lens positioned next to bundle 34 and lens 40 are not shown. The light emitted by each bundle is passed through its associated collimating lens onto half of its adjacent polarizing surface 24 or 26, thereby illuminating respective quadrants of the liquid crystal cell 16 by reflecting off the polarizing surfaces. Ideally, the lenses (38, 40 and 42) would take a point source and perfectly collimate the light, but in practice the light will be telecentric, i.e., the chief rays are collimated.

Figure 3:
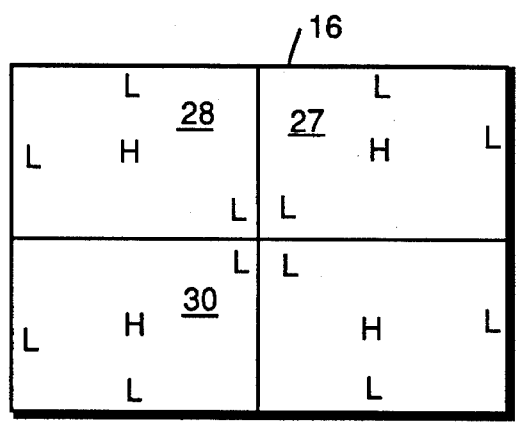
FIG. 3 is a diagram illustrating the illumination uniformity on the reflective light valve cell for FIGS. 1 and 2.

FIG. 3 illustrates the improved liquid crystal cell illumination uniformity realized by using four light sources to project the four readout beams onto respective quadrants of the cell 16. Each fiber bundle projects light through its associated collimating lens, which passes a light pattern with a relatively high light intensity "H" at its center and a relatively low light intensity "L" around its edges. The illumination intensities of adjacent quadrants are superimposed near their common edges, resulting in a relatively uniform intensity across the surface of the cell 16.

In FIGS. 1 and 2 the cell 16 spatially modulates the polarizations of the readout beams in proportion to the localized rotations of the individual liquid crystals, thus producing a spatial polarization modulation that corresponds to the image intensity pattern 20. The mirror 18 reflects the readout beams, which pass back through the cell to PBS 22. PBS 22 also functions as an analyzer to convert the polarization modulated readout beams into intensity modulated readout beams, of which beams 41 and 43 are shown in FIG. 1 and beams 41 and 45 are shown in FIG. 2. In the example of the LCLV, completely rotated crystals in the cell 16 corresponds to a maximum light intensity pixel on the image. The rotated crystal rotates the S-polarization of the input readout beam at a corresponding pixel location so that it has a P-polarization that is transmitted through the PBS. Unrotated crystals correspond to a zero light intensity point ion the image and leaves the S-polarization of the readout beam unchanged at a corresponding point so that it is reflected away from the readout by the PBS 22 by back towards the light source. In general, the intensity of the light transmitted through the PBS is proportional to the image intensity pattern 20.

The intensity modulated readout beams are projected through a projection lens system 44 that focuses the beams and reimages the image intensity pattern 20 onto a screen 46. One example of a projection lens system 44 includes a lens 48 that reduces the divergence of the readout beams, an f-stop (aperture) 50 that passes a predetermined cone angle of light reflected from the liquid crystal cell and a lens 52 that images the beams onto the screen 46. Lenses 48 and 52 are typically multi-element lenses whose specific design depends on the configuration of the display system. The f-stop is selected to pass a cone of light of approximately ±5° (in air) from the reflected readout beams to provide a high contrast image 54.

Figure 4:
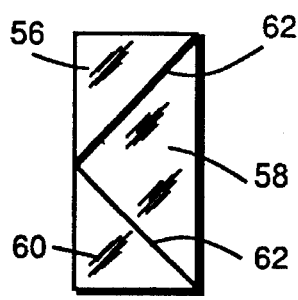
FIG. 4 is a sectional view of a glass prism polarizing beamsplitter.

FIG. 4 is a sectional view of a glass-prism implementation of PBS 22. The prism can be fabricated by bonding together three pieces of anisotropic material (56, 58 and 60), such as glass or quartz, that are cut at the appropriate angles, e.g. isosceles right triangles. The pieces' bonded sides are coated with a thin film 62 prior to bonding. The thin film is preferably a multi-layer coating that is designed to reflect S-polarized light, in which the electric field vector is perpendicular to the plane of incidence, and transmit P-polarized light, in which the electric field vector is parallel to the plane of incidence.

Figure 5:
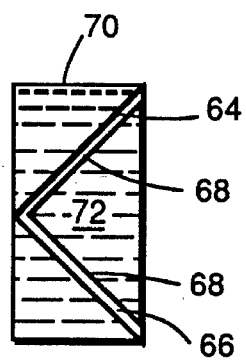
FIG. 5 is a sectional view of a fluid cell polarizing beamsplitter.

FIG. 5 is a sectional view of a fluid cell implementation of PBS 22. Glass or quartz plates 64 and 66 are coated with a polarizing thin-film 68, and immersed in a fluid filled cell 70 at the desired angles. An index matching fluid 72 is selected that has the same refractive index as the glass plates 64 and 66 and cell 70.

In an alternative PBS embodiment, two conventional single-surface PBSs that have half their normal width and thickness can be bonded side-by-side to produce a two surface polarizer. In another embodiment, two glass plates that are coated with the polarizing thin film can be bonded together in a 'V' shape. The only support in this configuration is the bond along the plates' leading edges, and thus it is very fragile. If the plates are suspended in air, this configuration also presents optical aberration problems with the introduction of coma and astigmatism.

Figure 6:
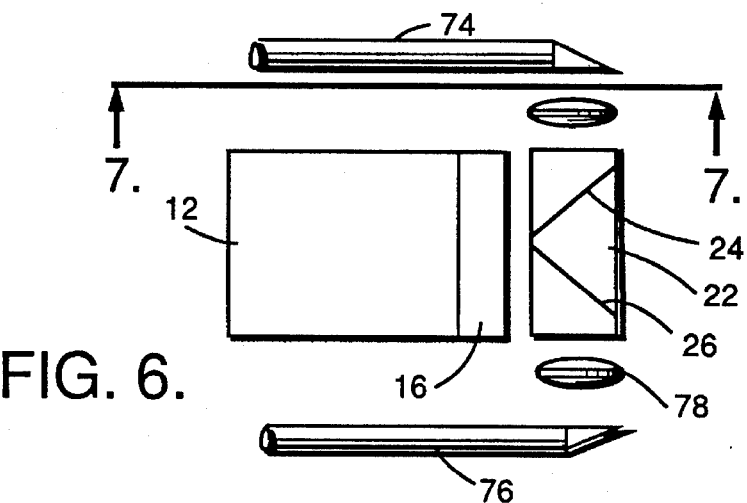
FIG. 6 is an elevation view of an alternative embodiment for illuminating the polarizing beamsplitter.
Figure 7:
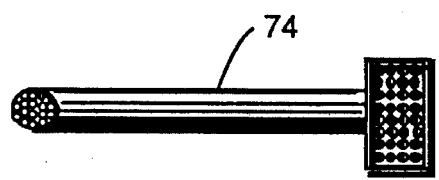
FIG. 7 is sectional view along section line 7—7 of the polarizing beamsplitter shown in FIG. 6.

FIG. 6 is a side view of an alternative illumination system for illuminating PBS 22. The fiber optic cable is split into two bundles 74 and 76 which project readout beams 28 and 30 through associated collimating lenses 77 and 78 to illuminate respective polarizing surfaces 24 and 26 and respective halves of the liquid crystal cell 16. As shown in FIG. 7, the ends of each bundle are pressed into a rectangular shape compatible with the shape of the polarizing surfaces 24 and 26.

Figure 8:
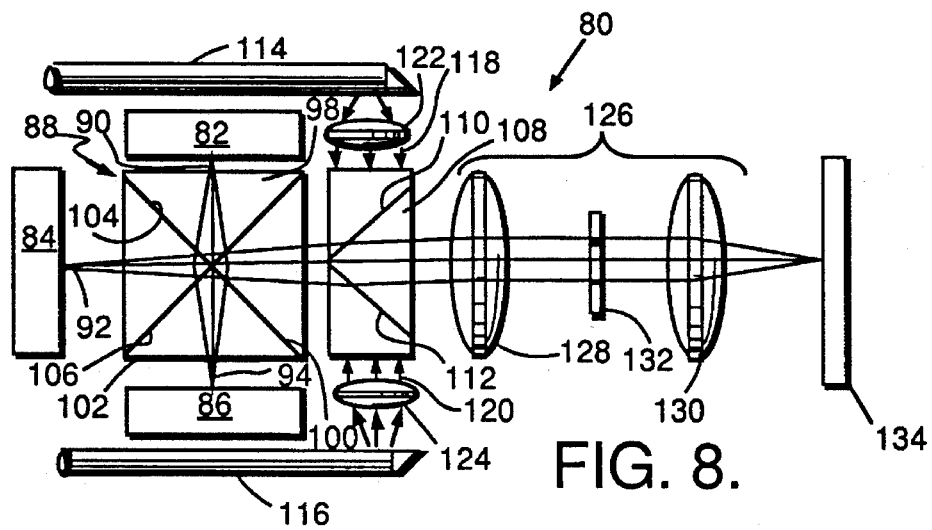
FIG. 8 is a simplified elevation view of a color image display system that uses the invention.

FIG. 8 is an elevation view of a color image display system 80. Three LCLVs (82, 84 and 86) of the type described above and shown in FIG. 1 are positioned adjacent to respective red, green and blue (RGB) surfaces of a dichroic prism 88 and modulated in accordance with respective RGB intensity patterns (90, 92 and 94). A typical dichroic prism is fabricated by cutting four pieces of glass (96, 98, 100 and 102) in the shape of isosceles right triangles, coating their interior surfaces with red and blue dichroic thin films, and bonding the coated surfaces together to form a cubic prism with red and blue dichroic surfaces. The dichroic prism 88 has a red reflecting surface 104 that reflects the red portion of the visible spectrum to illuminate LCLV 82, and a blue reflecting surface 106 that reflects the blue portion to illuminate LCLV 86. The green portion of the spectrum passes through both surfaces to illuminate LCLV 84.

A PBS 108 similar to the one described above and shown in FIGS. 1, 2, 4 and 5 is positioned next to the dichroic prism 88 and opposite the "green" LCLV 84. The PBS has polarizing surfaces 110 and 112 that are positioned at equivalent angles, preferably 45° with respect to its surface that faces the dichroic prism. Four fiber optic bundles (114, 116 and two not shown) project four readout beams, of which beams 118 and 120 are shown in FIG. 8, through four corresponding collimating lenses (122, 124 and two not shown) and onto polarizing surfaces 110 and 112, respectively.

The S-polarized components of the readout beams are reflected towards the prism 88, which splits them into their RGB components. The RGB components illuminate their respective LCLVs, which spatially modulate the RGB beams' polarizations in accordance with the RGB image intensity patterns. The three polarization modulated color components are reflected back to dichroic prism 88, which recombines the color components and then to PBS 108 which analyzes the polarization modular lob. The resulting image is transmitted through a projection lens system 126 that includes lenses 128 and 130 and an f-stop 132, and is reimaged onto a screen 134.

By utilizing a split PBS instead of a conventional single-surface PBS, the back focal length can be reduced by a factor of approximately two. As a result, the distance between the reflective light valve cell and the screen can be reduced by approximately half. Furthermore, the size and weight of the lenses can be reduced by approximately 10–20% because the divergence of the reflected readout beam is reduced. The overall reduction in length and weight allows LCLV image display systems to be implemented on Helmet Mountable Displays and in other portable display systems. Illuminating each quadrant of the liquid crystal cell with a separate light source improves the contrast and overall quality of the displayed image. The overall optical power of the system can be relatively high because the light is distributed uniformly across the polarizing surfaces.

While several illustrative embodiments of the invention have been shown and described, numerous variations and alternate embodiments will occur to those skilled in the art. For example, the light source could project S or P polarized readout beams, instead of unpolarized beams, through the optic fibers and onto the polarizing beam splitter, which would reflect the readout beams onto the reflective light valve cell. Such variations and alternate embodiments' are contemplated, and can be made without departing from the spirit and scope of the invention as defined in the appended claims.

We claim:

1. An image display system for projecting an image intensity pattern, comprising:

a polarizer having first and second polarizing surfaces;

a light source for projecting opposing readout beams onto respective polarizing surfaces of said polarizer, said surfaces reflecting either the S or P polarized components of said readout beams and passing the other components; and a reflective light valve cell positioned to impart said image intensity pattern onto said reflected components' polarizations and reflecting them towards said polarizer, said polarizer spatially modulating said reflected components' intensities in accordance with their polarization modulations.

2. The system of claim 1, wherein said reflective light valve cell is an active-matrix liquid crystal display (AMLCD).

3. The system of claim 1, wherein said reflective light valve cell is a photo-activated liquid crystal light valve (LCLV).

4. The system of claim 1, wherein said reflective light valve cell is a charge-coupled-device (CCD) liquid crystal light valve (LCLV).

5. The system of claim 1, wherein said polarizer comprises first and second glass plates that are coated with a polarizing thin-film and immersed in a fluid filled cell.

6. The system of claim 1, wherein said polarizer comprises a glass prism having first and second interfaces that are covered with respective thin-film coatings to form said polarizing surfaces.

7. The system of claim 6, wherein said interfaces are formed in said prism at substantially equal angles with respect to said cell.

8. The system of claim 1, wherein said readout beams are shaped to illuminate respective rectangular portions of said cell.

9. The system of claim 8, wherein said light source comprises first and second rectangular-shaped bundles of optical fibers for illuminating said rectangular cell portions.

10. The system of claim 1, wherein said light source comprises four bundles of optic fibers for illuminating respective quadrants of said light valve cell.

11. The system of claim 1, further comprising:

a display screen; and a projection lens that collects said intensity modulated readout beams and reimages them onto said screen.

12. The system of claim 11, further comprising:

a plurality of lenses for collimating said readout beams to project collimated light onto said polarizing surfaces.

13. A color image projection system for displaying color images consisting of red, green and blue (RGB) intensity patterns, comprising:

a polarizer having first and second polarizing surfaces;

a light source for projecting opposing readout beams onto respective polarizing surfaces of said polarizer, said surfaces reflecting either the S or P polarized components of said readout beams and passing the other components;

a color prism for splitting said reflected components into polarized RGB beams; and RGB reflective light valve cells positioned to impart said RGB image intensity patterns onto said polarized RGB beams, said color prism reflecting said polarization modulated RGB beams towards said polarizer, and said polarizer modulating their intensities in accordance with their respective polarization modulations.

14. The system of claim 13, further comprising:

a display screen; and a projection lens that collects said intensity modulated RGB beams and reimages them onto said screen.

* * * * *